United States Patent [19]

Schilling et al.

[11] 4,190,397
[45] Feb. 26, 1980

[54] WINDAGE SHIELD

[75] Inventors: Jan C. Schilling, Middletown; James E. Gutknecht, Cincinnati, both of Ohio

[73] Assignee: General Electric Company, Cincinnati, Ohio

[21] Appl. No.: 854,186

[22] Filed: Nov. 23, 1977

[51] Int. Cl.² .................................................. F01D 25/24
[52] U.S. Cl. .................................. 415/112; 415/108; 415/219 R; 416/244 A
[58] Field of Search .............. 415/172 R, 172 A, 174, 415/219 R, 116, 117, 112, 108, 119; 60/39.66; 403/23, 337, 336, 335, 338; 85/1 R, 9 R, 32.1, 50 R; 285/405, 412, 363, 368; 416/244 A, 244 R

[56] References Cited

U.S. PATENT DOCUMENTS

| | | | |
|---|---|---|---|
| 992,022 | 5/1911 | Matthews | 403/337 X |
| 2,764,266 | 9/1956 | Haworth | 285/405 |
| 3,501,089 | 3/1970 | Alford | 415/174 UX |
| 3,537,713 | 11/1970 | Matthews et al. | 415/174 X |
| 3,730,640 | 5/1973 | Rice et al. | 415/117 |
| 3,989,410 | 11/1976 | Ferrari | 415/116 X |
| 4,074,914 | 2/1978 | Novotny | 415/219 R |

FOREIGN PATENT DOCUMENTS

| | | | |
|---|---|---|---|
| 668715 | 3/1952 | United Kingdom | 403/337 |
| 1194781 | 6/1970 | United Kingdom | 415/172 |

*Primary Examiner*—Everette A. Powell, Jr.
*Assistant Examiner*—A. N. Trausch, III
*Attorney, Agent, or Firm*—Robert C. Lampe, Jr.; Derek P. Lawrence

[57] ABSTRACT

An improved windage shield is provided for use with turbomachinery members partially defining an internal flow path wherein the members are connected by a fastener which protrudes beyond one of the members. The windage shield comprises a portion which is captured between the fastener and one of the members and a cylindrical section which extends downstream of the members to form a smooth cover for isolating the members from the internal fluid flow. The protruding fastener end is recessed into, and generally flush with, the captured portion of the windage shield.

6 Claims, 4 Drawing Figures

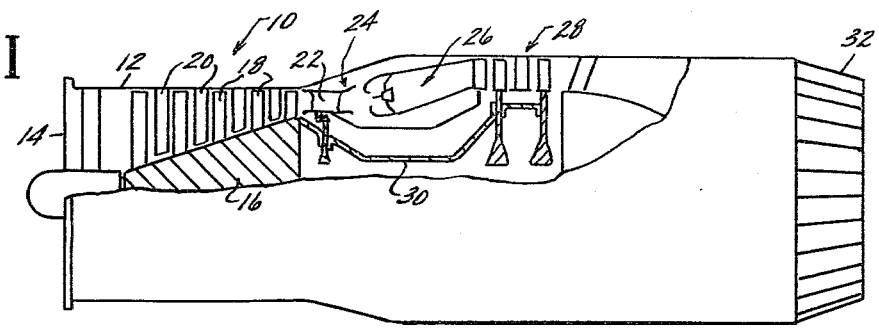
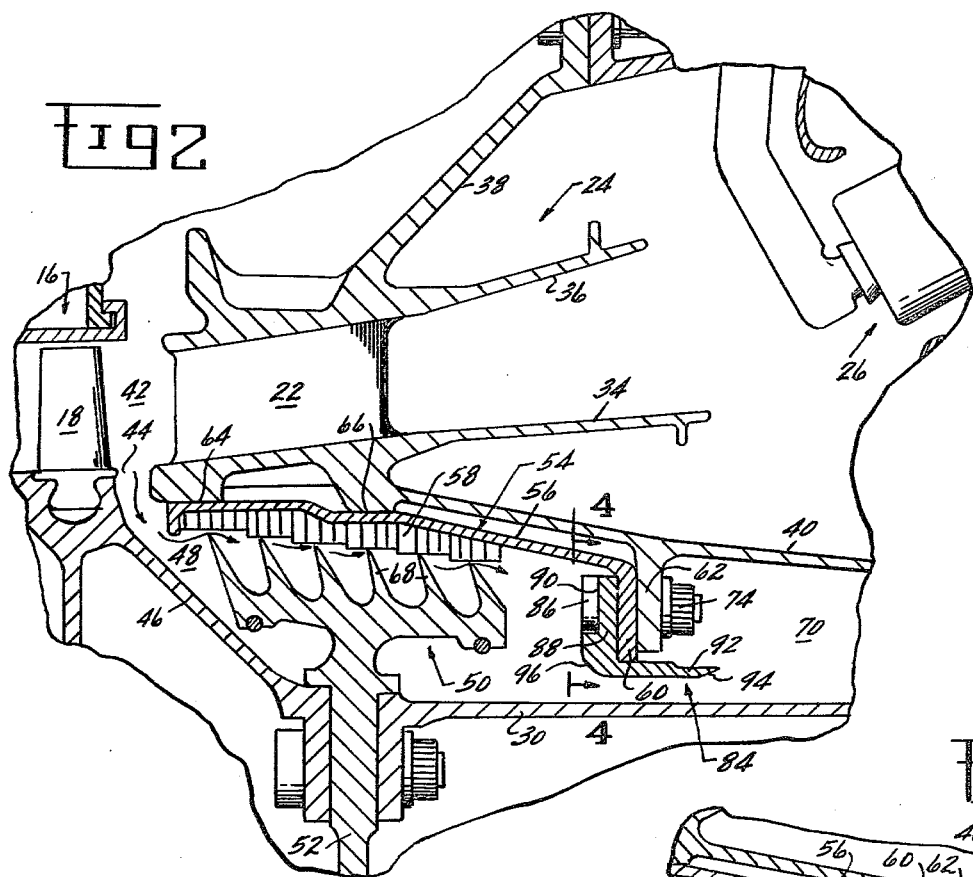
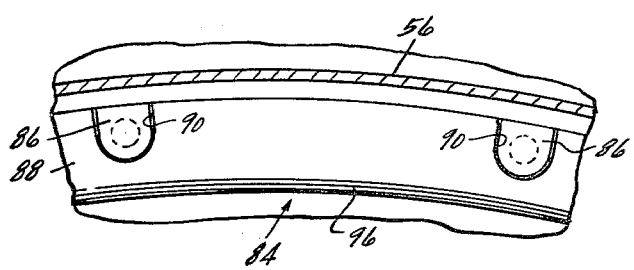
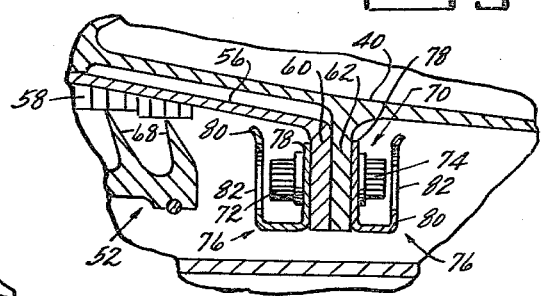
PRIOR ART

WINDAGE SHIELD

BACKGROUND OF THE INVENTION

This invention relates generally to gas turbine engines of the fluid-cooled variety and, more particularly, to an improved windage shield for minimizing the temperature rise associated with protrusions in the coolant flow stream.

It is well understood that gas turbine engine shaft horsepower and specific fuel consumption (which is the rate of fuel consumption per unit of power output) can be improved by increasing turbine inlet temperatures. However, current turbines are limited in inlet temperature by the physical properties of their components. Accordingly, many gas turbine engines currently employ fluid cooling to reduce the temperature of the turbine components which are exposed to the hot gases of combustion, thereby prolonging component life. The coolant is typically air which is bled from the compressor or fan section, routed to the turbine and circulated through the turbine disks and blades to effect cooling thereof in a manner well understood by those skilled in this art. In order to take advantage of the potential performance improvements associated with higher turbine inlet temperatures, modern fluid-cooling techniques permit operation at turbine inlet temperatures in excess of 2000° F. (1094° C.). U.S. Pat. Nos. 3,700,348 and 3,715,170, assigned to the assignee of the present invention, are excellent examples of this advanced turbine air-cooling technology incorporating impingement and film cooling.

However, the benefits obtained from such sophisticated air-cooling techniques are at least partially offset by the extraction by the necessary cooling air from the propulsive cycle and, in particular, from the compressor portion. This air which is bled from the compressor and used as a coolant for the turbine has had work done on it by the compressor. However, because it is normally reintroduced into the flow path downstream of the turbine nozzle, it does not return its full measure of work to the cycle as it expands through the turbine. The greater the amount of cooling air which is routed through the turbine, the greater the losses become on the propulsive cycle. Thus, while turbine blade cooling has inherent advantages, it also has associated therewith certain disadvantages which are functions of the quantity of cooling air used in cooling the turbine.

It will also be recognized that the quantity of cooling air required is a direct function of the temperature of the coolant: the lower its temperature, the less that is required. Many gas turbine engines embody a system for routing coolant from the compressor section to the turbine section in which the coolant is metered through at least one rotating seal. To obtain the regulated amount of seal flow (coolant) with minimum performance degradation, the seal is designed to operate with minimal running clearances. These tight clearances produce a temperature rise in the air passing through the seal so that the air has already lost some of its useful cooling capacity prior to reaching the turbine. This situation is aggrevated even further by the presence of protrusions (such as bolts and nuts) which function as turbulence generators, tripping and churning the air in the coolant passage with an attendant increase in temperature level. In particular, often the rotating turbomachinery is fabricated of several components which are connected together at radially inwardly extending mating flanges by at least one circle of axially extending bolts. The source of temperature rise is the relative motion of air impinging on the bolts producing churning of the air. Previous attempts have been made to shield the coolant from such protrusions, but these attempts have not been entirely satisfactory since even the shields have produced some turbulence in the coolant.

It will, therefore, be appreciated that engine performance can be increased by reducing the amount of cooling air required by the turbine and that one means for reducing the quantity is by reducing the temperature rise in the cooling air due to turbulence generators so that a lesser quantity of cooling air can perform the same degree of cooling. Conversely, an increase in turbine component life can be achieved by maintaining the original coolant flow rate but by reducing any temperature rises associated with turbulence generators in routing the coolant to the turbine, with essentially no further degradation in engine performance.

SUMMARY OF THE INVENTION

Accordingly, it is the primary object of the present invention to provide an improved windage shield for use in gas turbine engines to minimize the temperature rise in cooling air due to protrusions and, more particularly, to nut and bolt protrusions associated with flange connections in the coolant flow path.

This, and other objects and advantages, will be more clearly understood from the following detailed description, the drawing and specific examples, all of which are intended to be typical of rather than in any way limiting to the scope of the present invention.

Briefly stated, the above objective is accomplished by providing an improved windage shield for use with bolted flange connections which protrude into the coolant passage. The shield of the present invention comprises a continuous ring of generally L-shaped profile which is captured between the bolt head and the upstream-most flange. The captured flange portion of the shield is provided with a plurality of circumferentially spaced milled slots contoured to receive D-shaped bolt heads. These bolt heads are mounted flush with the upstream captured portion of the shield, thus eliminating open access hole and protruding bolts. The combination of D-shaped heads and contoured slots provides a means for torquing the bolts. The cylindrical section of the L-shaped shield extends downstream of the mating flanges and past the nut side of the bolted connection to direct cooling air past the nut, thereby minimizing churning from the nut. Additionally, the transition between the captured portion and the cylindrical section incorporates a large turning radius section to further reduce windage.

DESCRIPTION OF THE DRAWING

While the specification concludes with claims particularly pointing out and distinctly claiming the subject matter which is regarded as part of the present invention, it is believed that the invention will be more fully understood from the following description of the preferred embodiment which is given by way of example with the accompanying drawing in which:

FIG. 1 is a view in partial cross section of gas turbine engine incorporating the present invention;

FIG. 2 is an enlarged view of a portion of the engine of FIG. 1 depicting the windage shield of the present invention in greater particularity;

FIG. 3 is a view, similar to FIG. 2, illustrating a windage shield constructed in accordance with the prior art; and FIG. 4 is a view of a portion of the windage shield of the present invention taken along line 4—4 of FIG. 2.

DESCRIPTION OF THE PREFERRED EMBODIMENT

Referring to the drawing wherein like numerals correspond to like elements throughout, reference is initially directed to FIG. 1 wherein a gas turbine engine depicted generally at 10 is diagrammatically shown. The engine 10 includes a casing 12 forming an air inlet 14, a compressor rotor 16 having rows of rotor blades 18 interspaced between rows of stationary stator vanes 20, which are affixed at their outer ends to the inner surface of the housing 12. At the downstream end of the compressor 16 is a row of compressor outlet guide vanes (OGV's) 22, followed by an annular diffuser passage or compressor discharge passage indicated generally at 24. The diffuser passage 24 discharges the pressurized air into a combustor 26 from whence the heated products of combustion pass through and drive turbine 28 which, in turn, drives compressor 16 through shaft 30 in the usual manner of a gas turbine engine. The hot gas stream is then discharged through a nozzle 32 to provide the propulsive force of the engine.

The above description is typical of many present-day engines and is not meant to be limiting, as it will become readily apparent from the following description that the present invention is capable of application to any gas turbine engine and is not meant to be restricted to engines of the turbojet variety. For example, the subject invention is applicable both to engines of the gas turbofan type and to advanced mixed cycle engines as will be readily apparent to those skilled in this art. The above description of the engine depicted in FIG. 1 is, therefore, meant to be illustrative of one type of application.

Directing attention now to FIG. 2 it will be observed that diffuser 24 comprises a pair of concentric inner and outer walls 34 and 36, respectively, divergent in the downstream direction and formed integrally with the stage of outlet guide vanes 22. A diffuser outer frame 38 and a diffuser inner frame 40 support the outlet guide vanes as shown in the proper relationship between upstream compressor 16 and downstream combustor 26. As discussed previously, the turbine portion of the gas turbine engine is typically cooled by air pressurized by the compressor. This coolant air is bled from the compressor flow path 42 through an annular gap 44 between the last stage of rotor blades 18 and outlet guide vanes 22 and thereafter flows along frustoconical rotor member 46 into passage 48. The coolant flow rate is metered by the compressor discharge pressure (CDP) seal 50 which comprises a rotating seal portion 52 and a stationary seal portion 54. The CDP stationary seal portion 54 is associated with the diffuser inner frame 40 and is configured for replaceability in event of excess seal wear. This stationary seal portion comprises a rigid seal support 56 upon which a honeycomb seal material 58 has been bonded in a step-wise manner as indicated. The CDP stationary seal portion 54 is supported from diffuser inner frame 40 by means of radially inwardly extending flanges 60, 62 which are bolted together as shown and also by means of abutting contacts between the seal support 56 and diffuser inner frame 40 at 64 and 66. CDP rotating seal member 52 is captured between frustoconcial compressor rotor member 46 and shaft 30 as indicated and comprises a plurality of axially spaced annular labyrinth seal teeth 68 which extend into close proximity to honeycomb seal material 58. In order to obtain the desired metered amount of coolant flow, and yet minimize overall engine performance degradation, seal 50 is designed to operate with minimal running clearances between the labyrinth seal teeth 68 and stationary honeycomb seal material 58. This minimal clearance causes a temperature rise in the air passing through the seal as indicated by the arrows so that the air exiting the seal has already lost some of its useful cooling capacity prior to entering annular passageways 70 between shaft 30 and diffuser inner frame 40 from whence it is routed through the turbine in a manner well known in this art.

Attention is now directed to FIG. 3 which depicts in greater particularly a prior art scheme for connecting flanges 60 and 62 while attempting to minimize windage and turbulence. It may be appreciated that where the flanges are bolted together by a plurality of bolts 70 arranged in a circle, each having a bolt head 72 and a nut 74 for capturing the flanges therebetween, the bolt heads and nuts produce turbulent mixing and churning of the coolant flow as it passes over them, thereby raising the temperature of the coolant. In an attempt to minimize any such additional temperature rise of the coolant air caused by such protrusions, the windage shields 76 have been employed. These windage shields are generally U-shaped in profile with one leg 78 captured between the bolt head 72 or nut 74 and the respective flange, and the other leg 80 covering the protrusion. Typically, the windage shields are annular, but segmented for ease of installation, and are provided with a plurality of holes 82 in the outward leg which are in alignment with the nuts or bolts to facilitate installation. It may be appreciated that whereas these prior art windage shields reduce in a measurable degree the temperature rise associated with churning of the coolant air, these shields still trip and churn the air by means of access holes 82 and any gaps (not shown) between shield segments. It is toward the elimination of these sources of coolant temperature rise that the present invention is directed.

Referring again to FIG. 2, the improved windage shield 84 is shown to comprise a continuous ring of generally L-shaped cross section which is captured between a modified bolt head 86 and the upstream flange 60. Referring also to FIG. 4, it is seen that the captured portion 88 is provided with a plurality of circumferentially spaced recessed regions in the form of milled slots 90 of generally D-shaped profile. Modified bolt heads 86 are of a similar contour and are adapted to be received and retained in the milled slots so that the bolt is restrained against rotation by the sides of the milled slots. The thickness of the bolt heads and the depth of the slots are similar so that the bolt heads are flush-mounted within and therefore form a generally flush interface with the surrounding surfaces of the upstream captured side of the shield, thus eliminating open access holes and upstream protruding bolt heads 86. A cylindrical section 92 of the L-shaped shield 84 extends downstream of the mating flanges 60, 62 and past the downstream nut side of the bolted connection to direct the flow of cooling air past nut 74, thereby minimizing churning of the coolant by the nut. The length of the cylindrical section 92 need be just sufficient to guide the flow past nut 74, and the section may be contoured as at 94 to provide diffusion and turning of the flow into passage 70. The transition between the captured portion 88 and the cylindrical section 92 is shown to incorporate a large turning radius section 96 to further reduce windage losses. Since the cylindrical section is a 360° shell, the present invention eliminates gaps between segments of prior art windage shields. Furthermore, it may be appreciated by comparing the windage shields of FIGS. 2 and 3 that the present invention requires less space than the prior art device. In particular, the improved windage shields provide for a greater distance between CDP seal 50 and the windage shield, thus providing a larger area for turning the coolant and further reducing windage due to the proximity of close-coupled rotating and stationary hardware.

Thus the present invention provides a significant improvement over prior art windage shields by which the turbine coolant temperature rise will be minimized as it is routed from the compressor to the turbine portions of the engine. As a result, a lesser amount of coolant will be required to perform a given cooling task, thereby resulting in improved engine cycle performance.

It should be obvious to one skilled in the art that certain changes can be made to the above-described invention without departing from the broad, inventive concepts thereof. For example, the improved windage shield of the present invention is not limited in application to use with bolted connections, but is applicable to any type of fastener which protrudes into a fluid flow stream. Additionally, the flow stream need not be one for the passage of coolant since incorporation of the present invention into any flow path can reduce pressure losses therein and thereby enhance the passage of flow. Additionally, the invention is not limited to protrusions associated with turbomachinery flanges, but is also applicable to fasteners and protrusions associated with any rotatable member partially defining a flow path. It is intended that the appended claims cover these and all other variations in the present invention's broader inventive concepts.

Having thus described the invention, what is claimed as novel and desired to be secured by Letters Patent of the United States is:

1. A windage shield for use in a fluid flowpath within a gas turbine engine to reduce fluid turbulence in a region of a first and second member and a fastener, each member having a generally radially extending flange connected together by the fastener, wherein an end of the fastener protrudes axially beyond said first member in the upstream direction, said windage shield comprising:
   (a) a radially extending portion captured between the fastener and the first member;
   (b) a recessed region within said radially extending portion wherein the upstream protruding end of said fastener provides a generally flush interface between the protruding end of said fastener and surrounding surfaces adjacent said upstream end; and
   (c) a cylindrical section extending axially from said flange and extending downstream of said first and second members.

2. A windage shield for use in a fluid flowpath from an upstream direction to a downstream direction with a flange and a fastener for attaching a member to said flange wherein an upstream end of the fastener protrudes beyond said flange, said windage shield comprising:
   (a) a ring having a portion which is captured between the fastener and the flange;
   (b) a cylindrical portion which extends past said flange for directing fluid flow downstream; and
   (c) a recessed region within said captured portion of said ring wherein the upstream protruding portion of the fastener forms a generally flush interface between the upstream end of said fastener and surfaces adjacent said upstream end.

3. The windage shield as recited in claim 2 wherein said upstream end of said fastener has a contoured head which protrudes upstream beyond said flange and wherein said recessed region comprises a slot contoured similarly to that of the contoured head and adapted to receive said fastener head and prevent rotation thereof.

4. The windage shield as recited in claim 2 wherein said ring is of generally L-shaped cross section and wherein the transition between the captured portion and the cylindrical portion incorporates a turning radius section.

5. A windage shield for use with a first member partially defining a flow path, a second member, and a fastener for connecting said members together wherein an end of the fastener protrudes upstream beyond said first member, said windage shield comprising a portion which is captured between the fastener end and the first member and a cylindrical section which extends downstream of the first member, and wherein the protruding end is recessed into, and generally flush with, said captured shield portion.

6. A windage shield for use with a pair of members partially defining a fluid flow path, each member having a generally radially extending flange, said flanges being connected by a bolt having a head and a nut which protrude into the flow path, said windage shield comprising a ring having a portion which is captured between the bolt head and a flange and a cylindrical portion which extends downstream past said flanges and said bolt, and wherein said bolt head is generally flush with said captured shield portion.

* * * * *